United States Patent
Matsuda et al.

[11] Patent Number: 6,144,110
[45] Date of Patent: Nov. 7, 2000

[54] VEHICULAR USE POWER DISTRIBUTION APPARATUS AND VEHICULAR USE POWER SOURCE APPARATUS

[75] Inventors: Yutaka Matsuda; Satoshi Kawai; Shigeki Motomura, all of Kanagawa, Japan

[73] Assignee: The Furukawa Electric Co., Ltd., Tokyo, Japan

[21] Appl. No.: 09/040,410

[22] Filed: Mar. 18, 1998

[30] Foreign Application Priority Data

| Mar. 19, 1997 | [JP] | Japan | 9-066998 |
| Mar. 24, 1997 | [JP] | Japan | 9-069846 |
| Mar. 24, 1997 | [JP] | Japan | 9-070045 |

[51] Int. Cl.$^7$ .................................................. H02H 3/00
[52] U.S. Cl. ............................ 307/10.1; 307/9.1; 307/30; 307/38; 307/39; 361/64; 361/67; 701/29
[58] Field of Search .................................. 307/10.1, 9.1, 307/10.7, 117, 10.6, 125, 30, 38, 39; 180/271, 279; 320/116, 118, 120; 361/64, 67; 701/29; 340/436

[56] References Cited

U.S. PATENT DOCUMENTS

| 3,743,849 | 7/1973 | Iwata | 180/279 |
| 4,733,100 | 3/1988 | Nusairat et al. | 307/10.7 |
| 5,175,484 | 12/1992 | Witehira et al. | 307/10.6 |
| 5,325,038 | 6/1994 | Banzai et al. | 320/135 |

FOREIGN PATENT DOCUMENTS

| 62-91339 | 4/1987 | Japan . |
| 62-172631 | 11/1987 | Japan . |
| 6-262987 | 9/1994 | Japan . |
| 6-316242 | 11/1994 | Japan . |

*Primary Examiner*—Albert W. Paladini
*Attorney, Agent, or Firm*—Armstrong, Westerman, Hattori, McLeland & Naughton

[57] ABSTRACT

A vehicular use power distribution apparatus includes a battery mounted in a vehicle; a main control means connected directly to the battery; a first switch means connected to the battery; a power feed line for loads connected to the first switch means and supplying power to loads mounted in the vehicle; a second switch means connected to the battery; a power feed line for control means connected to the second switch means and controlling the loads; and a sub control means connected to the power feed line for control means. In a first state, the main control means sets the first switch means and the second switch means to a connection state so as to supply power from the battery to the power feed line for loads and the power feed line for control means. When there is not change in first and second mode switching signals within a first predetermined time after a change of first mode switching signal, the main control means sets the first switch means to a non-connection state to set a second state where the supply of power to the power feed line for loads is stopped. After a second predetermined time has passed in the second state, the main control means sets the second switch means to a non-connection state to set a third state where the supply of power to the power feed line for loads is stopped.

19 Claims, 9 Drawing Sheets

VEHICULAR USE POWER DISTRIBUTION APPARATUS AND VEHICULAR USE POWER SOURCE APPARATUS

BACKGROUND OF THE INVENTION

1. Field of the Invention

The present invention relates to a vehicular use power distribution apparatus which feeds power for various electrical components, apparatuses, and equipment mounted in a passenger car or other vehicle, more particularly relates to a vehicular use power distribution apparatus and a vehicular use power source apparatus with which a reduction of power consumption is achieved.

2. Description of the Related Art

When a passenger car or other vehicle is stopped or is not being operating, while the vehicle may be designed to sound an alarm to indicate when, for example, the door is left half open, the driver will sometimes not notice the alarm and leave the door open for a long time—resulting in exhaustion of the battery life.

Further, if the driver mistakenly leaves the headlights or room light on when the vehicle is not being operated, the battery will also be drained.

There are various other factors which will drain the battery power when a vehicle is not in operation. A typical example is the supply of power for the electronic control system—which has to be kept in fast starting state at all time in order to start up the vehicle. At the heart of the electronic control system is an electronic control unit which is normally constituted by a microprocessor etc. To minimize the power consumption of the microprocessor etc., they are often placed in a sleep mode when the vehicle is not in operation or stopped. Even in the sleep mode, however, if there are a large number of microprocessor-based electronic control units, a considerable amount of power will still be consumed.

Further, when leaving a vehicle idle for a long period of time, such as when placing a vehicle in long term storage or when shipping a vehicle overseas and transporting it over the long period of time from the country of origin to the destination country, the buildup of a leakage current in the sleep mode causes the battery life to drop considerably or exhausts the battery life.

In particular, in recent years, vehicles have made increasing use of electronics. Numerous electronic apparatuses are now being mounted in vehicles. This is further increasing the consumption of the battery. There are limits to a battery's capacity, however, so the problems described above cannot be sufficiently solved.

To prolong the battery life, various approaches for reducing the consumption of battery power may be considered.

For example, to deal with the above-mentioned failure to turn off the room light, the method may be considered of having the vehicle monitor the situation and automatically stopping the supply of power to the inadvertently left on room light and all other electrical systems which should not be operating when the vehicle is not in operation or stopped after a predetermined time has passed after the vehicle stops being operated or has been stopped. However, the electronic control system for monitoring the status of the vehicle has to continuously operate, so the supply of power for the electronic control system consumes the battery power as a leakage current. Even when the electronic control system is in the sleep mode, if there are a large number of electronic control circuits and the vehicle is not operated over a long period of time, a considerable amount of the battery power will be consumed.

When a vehicle is put away for long term storage, shipped overseas, or otherwise not used for a long period of time, the fuse at the output side of the battery is sometimes removed. It is true that by removing the fuse, the supply of power to all of the electrical systems of the vehicle is completely stopped, so the only reduction in the battery power will be that accompanying long term natural discharge.

However, removing a fuse when not using a vehicle for a long term and reinserting it when again using the vehicle is troublesome. Also, the worker might touch the power line of the battery so the work of detaching and attaching the fuse is dangerous.

Conventional power supply systems are not clearly divided into a power supply systems for loads such as room lights and headlights and power supply systems for electronic control systems. Therefore, the above measures to reduce power consumption when the vehicle is stopped are not effective.

Further, in passenger cars and other vehicles, the electronic control circuit, electrical components, power windows and wipers, and other auxiliary equipment are normally supplied with power from a battery, relay box, and joint box via power feed lines (cables). The auxiliary equipment is arranged at predetermined locations in a vehicle. For example, the meters etc. are arranged at the instrument panel, while the hazard lamps are located at the rear of the vehicle.

Generally in the engine compartment of a vehicle, the relay box is located far away from the battery. The battery and the relay box are connected by a thick large current carrying cable. Normally, the battery and cable are connected by engaging a taper terminal defined by JIS D5301 and an adapter crimping the cable to a nut-and-bolt terminal and then tightening the two by the nut and bolt.

It is however troublesome space-wise and design-wise to lay a thick large current carrying cable between the battery and relay box in the engine compartment and to lay cables to the load side. Further, since the battery and relay box each take up space, the two occupy a certain amount of space in the engine compartment and make the engine compartment cramper.

In particular, the increasingly sophisticated functions of vehicles mean that various members, apparatus, and electronic control apparatuses are located in the engine compartment. The power cables therefore have to be weaved between these apparatuses and members and become much more complicated.

When for example a short-circuit occurs in a power feed line, the vehicle is involved in a collision, or some other problem or trouble occurs in the vehicle, the supply of power to the electrical components, electronic control apparatuses, etc. should be stopped quickly.

It has been proposed to shut off the power source when a vehicle is involved in a collision, but the conventional method has been to break the circuit in the relay box, so the large current carrying cable between the battery and the relay box continues to be live. Accordingly, there is a possibility of the live cable in the engine compartment will short-circuit and another accident will be caused.

Further, while the battery terminal, as described above, is prescribed in JIS D5301, the plus pole and minus pole of the nut-and-bolt terminal are the same in shape, so there is a possibility of connection with the wrong polarity. If connected in reverse, the electronic apparatuses and electronic devices mounted in the vehicle may be ruined.

In another area, normally, one battery or two batteries connected in parallel are mounted in a vehicle. The battery is a storage battery comprised of a plurality of cells each having an electromotive force of approximately 2.1V per cell connected in series and supplies 12V or 24V of voltage for driving loads from the cells at the two ends. This voltage is used for starting the engine and driving other loads of the vehicle. The output terminal of the vehicular storage battery is connected to the mounted load apparatus and starter via a relay box or joint box.

As already mentioned, large numbers of electronic control circuits have been mounted in load apparatuses along with the increasing sophistication of vehicles. 5V to 6V is need to drive these electronic control circuits, so the voltage supplied from the battery cannot be used as it is. Conventionally, therefore, for example, each mounted load apparatus is provided with a DC voltage transformer for transforming the 12V or 24V voltage from the battery for driving load apparatuses to the 5V to 6V for driving the electronic circuits.

However, if each mounted load apparatus is provided with an expensive DC voltage transformer, the number of DC voltage transformers will increase along with an increase in the number of mounted load apparatuses, the hardware configuration will become more complicated, and the manufacturing cost will increase. Note that the further use of electronics in vehicles will result in an increase in the number of load apparatuses mounted as well.

To solve these problems, it has been proposed to provide one DC voltage transformer in the relay box, transform the voltage for driving loads supplied from the battery to a voltage for driving electronic circuits all together in the relay box, and distribute the obtained voltage for driving electronic circuits to a plurality of electronic control circuits.

According to this method, it is possible to reduce the number of the DC voltage transformers, however, at least one DC voltage transformer is still needed. In this case, a large capacity DC voltage transformer is needed, so the price becomes very high.

SUMMARY OF THE INVENTION

A first object of the present invention is to provide a vehicular use power distribution apparatus which overcomes the above problems, in particular, which minimizes the power consumption when the vehicle is not in operation or is not being used.

A second object of the present invention is to provide a vehicular use power source apparatus which enables connection of the battery and relay box without using cables.

A third object of the present invention is to provide a vehicular use power source apparatus which enables the supply of power from the battery to the relay box to be stopped quickly when trouble occurs.

A fourth object of the present invention is to provide a vehicular use power source apparatus free from mistaken connection to reverse polarities.

A fifth object of the present invention is to provide a vehicular use power source apparatus which can be made small in size overall.

A sixth object of the present invention is to provide a vehicular use power source apparatus which can be supply both the voltage for driving loads and voltage for driving electronic control circuits by a simple and inexpensive configuration.

The present invention clearly divides the power feed system into a power feed system for the loads and a power feed system for the control means and other electrical systems. Next, regarding the supply of power to the control means and other electrical systems, power is supplied for a predetermined time when the vehicle is not in operation or stopped. In the non-operating periods possible in normal usage of vehicles, power is supplied to predetermined electronic control units without obstacle. When the non-operating state continues for a long period, power is supplied to some electronic control units, but is completely cut off to other electronic control units and all loads so as to minimize the battery consumption.

According to a first aspect of the present invention, there is provided a vehicular use power distribution apparatus comprising a battery mounted in a vehicle; a main control means connected directly to the battery; a first switch means connected to the battery; a power feed line for loads, connected to the first switch means, for supplying power to loads mounted in the vehicle; a second switch means connected to the battery; a power feed line for control means, connected to the second switch means, for controlling the loads; and a sub control means connected to the power feed line for control means, wherein the main control means, in a first state, sets the first switch means and the second switch means to a connection state so as to supply power from the battery to the power feed line for loads and the power feed line for control means; when there is no change in first and second mode switching signals within a first predetermined time after a change of at least one first mode switching signal, the main control means sets the first switch means to a nonconnection state to set a second state where the supply of power to the power feed line for loads is stopped; and after a second predetermined time has passed in the second state, the main control means sets the second switch means to a nonconnection state to set a third state where the supply of power to the power feed line for loads is stopped.

Preferably, the vehicular use power distribution apparatus further comprises a third switch means for determining whether to supply power to each load, wherein the main control means and the sub control means control the third switch means so as to drive the corresponding loads.

Preferably, the second mode switch signal includes an ignition key switching signal or a door lock signal.

Preferably, in the second state, the main control means returns the vehicular use power distribution apparatus to the first state in accordance with a change in the first mode switching signal or a change in the second switching signal.

Preferably, the second mode switching signal includes a switching signal for lighting a room lamp of a vehicle, a switching signal for opening and closing doors, or a switching signal for lighting headlights.

Preferably, in the third state, the main control means returns the vehicular use power distribution apparatus to the first state in accordance with a change of the third mode switching signal.

Preferably, the third mode switching signal includes an ignition key switching signal.

Preferably, the first switch means includes a relay switch circuit and the second switch means includes a semiconductor switching element.

Preferably, the control means has a microprocessor and defines a sleep mode in which the consumption of electricity becomes minimum when stopping.

According to a second aspect of the present invention, there is provided a vehicular use power source apparatus comprising a housing for housing a battery and an electrical circuit unit having a control means and a switch means for determining whether to supply power from the battery under the control of the control means.

Preferably, the battery and the switch means are connected by a conductive member able to absorb vibration in the vehicular use power source apparatus.

Preferably, the vehicular use power source apparatus comprises a connecting member between the battery and the switch means above the battery housing and the switch means of the electrical circuit unit fit into the connecting member of the battery housing and the electrical circuit unit forms an upper cover of the battery housing.

Preferably, the control means receives as input a signal indicating detection of a collision and drives the switch means so as to stop the supply of power from the battery to the outside.

Preferably, the control means receives as input a signal indicating a fuel leak and drives the switch means so as to stop the supply of power from the battery to the outside.

Preferably, the control means receives as input a signal indicating permission for driving a load and drives the switching means so as to enable the supply of power from the battery to an external load.

Preferably, the electrical circuit unit further comprises a switch means for connecting to an alternator and the control means is supplied with an alternator driving signal to drive the switch means and enable charging of the battery.

According to a third aspect of the present invention, there is provided a vehicular use power source apparatus comprising a battery comprising a plurality of cells connected in series; a power feed line for loads led out from an electrode of a first cell located at an end of the battery and supplying voltage for driving loads produced by storing all of the electromotive force of the plurality of cells; a power feed line for control means led out from an electrode of a second cell located at other than an end of the battery and supplying voltage for driving a control means produced by storing the electromotive forces of the cells connected in series between a cell located at the end or non-end and the second cell; a driving means of a load of a vehicle connected to the power feed line for loads and driving the loads of the vehicle by the voltage for driving loads; and a control means connected to the power feed line for control means and control drive of the load by the voltage for driving the control means.

Preferably, the control means is located adjacent to the battery.

Preferably, the driving means of loads of the vehicle is connected with the power feed line for loads via a first switch means; and the control means is connected with the power feed line for control means via a second switch means.

DESCRIPTION OF THE PREFERRED EMBODIMENTS

The above and other objects and features of the present invention will be described in more detail with reference to the accompanying drawings, in which.

DESCRIPTION OF THE PREFERRED EMBODIMENT

Below, an explanation will be made of preferred embodiments of the present invention with reference to the drawings.

First Embodiment

Figure 1:
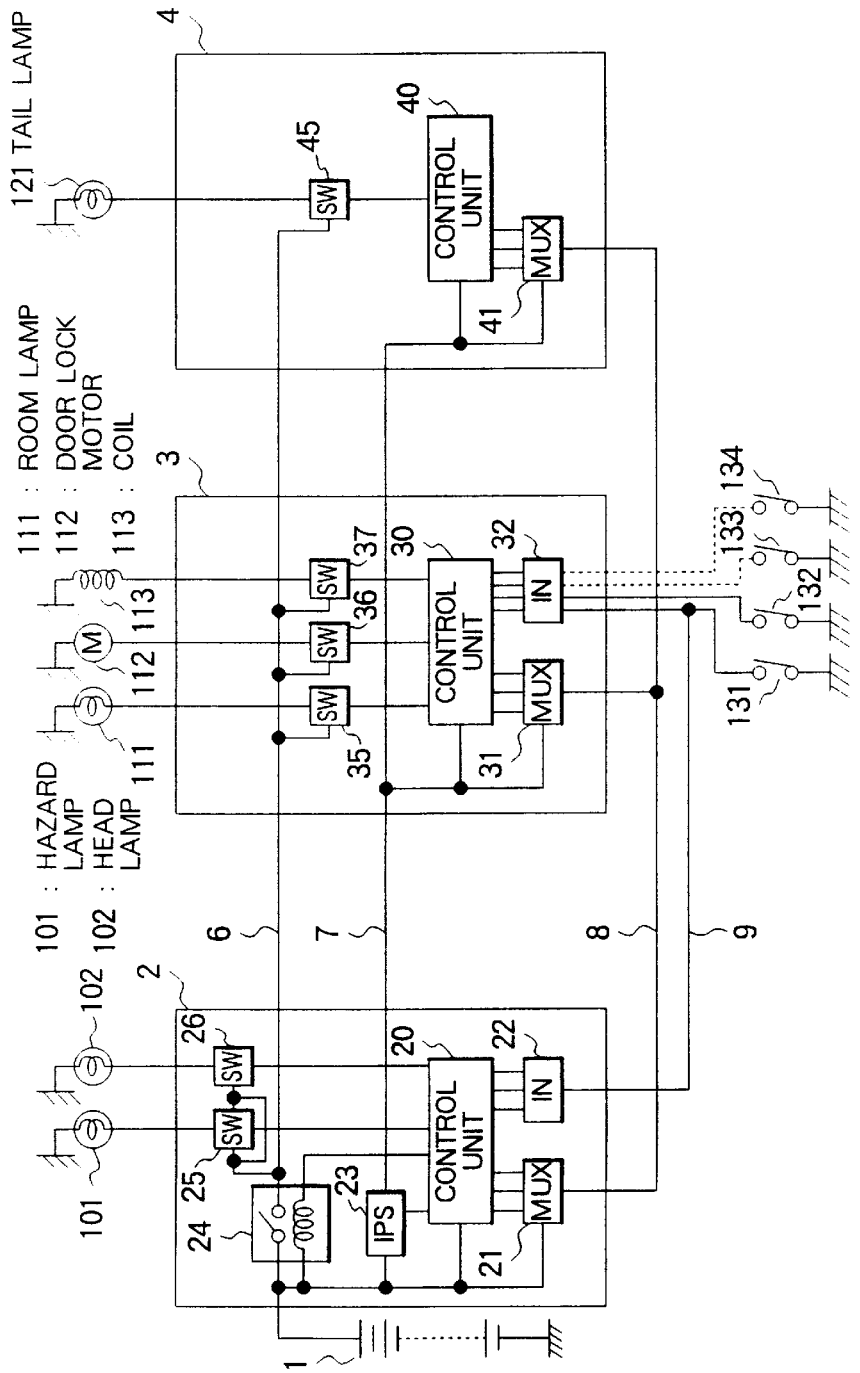
FIG. 1 is a view of the configuration of a vehicular use power distribution apparatus of a first embodiment according to the present invention.

FIG. 1 is a view of the configuration of a vehicular use power distribution apparatus of a first embodiment according to the present invention. The vehicular use power distribution apparatus shown in FIG. 1 comprises a battery 1, a main power distribution unit 2 located close to the battery 1, a sub power distribution unit 3 receiving power via the main power distribution unit 2, and a sub power distribution unit 4.

The main power distribution unit 2 is located close to the battery 1, the sub power distribution unit 3 is located close to the operation switches, and the sub power distribution unit 4 is located close to specific loads.

The number of the sub power distribution units is not limited to the two illustrated in the figure. Other sub power distribution units are provided according to need. However, in the present embodiment, two sub power distribution units are shown to simplify the illustration.

Further, as a load, a hazard lamp 101 is shown as an example.

The main power distribution unit 2 comprises a control unit 20, a multiplex signal transmission unit 21, a signal input unit 22, an intelligent power switch (IPS) 23, a relay switch circuit 24, and operating switch circuits 25 and 26.

The operating switch circuits 25 and 26 are connected to the hazard lamp 101 and headlights 102 respectively.

The control unit 20 includes a microprocessor, a memory, etc. and controls the IPS 23 and the relay switch circuit 24 in accordance with information input via the signal input unit 22 and information exchanged with the sub power distribution unit 3, the sub power distribution unit 4, etc. via the multiplex signal transmission unit 21. The control operation of the control unit 20 will be described later.

The control unit 20, the multiplex signal transmission unit 21, and the signal input unit 22 correspond to the electrical circuits of the present invention, while the hazard lamp 101 and the headlights 102 correspond to the loads of the present invention.

The sub power distribution unit 3 comprises a control unit 30, a multiplex signal transmission unit 31, a signal input unit 32, and operating switch circuits 35 to 37.

The operating switch circuits 35, 36, and 37 are connected to a room lamp 111, a door lock motor 112, and a coil 113, respectively.

The control unit 30 also includes a microprocessor, memory, etc. and controls the operating switch circuits 35 to 37 in accordance with information input via the signal input unit 32 and information exchanged with the main power distribution unit 2 and the sub power distribution unit 4 through the multiplex signal transmission unit 31. The control operation of the control unit 30 is described later.

The control unit 30, the multiplex signal transmission unit 31, and the signal input unit 32 correspond to the electrical circuits of the present invention, while the door lock motor 112 and the coil 113 correspond to the loads of the present invention.

The sub power distribution unit 4 comprises a control unit 40, a multiplex signal transmission unit 41, and an operating switch circuit 45. The operating switch circuit 45 is connected to the tail lamps.

The control unit 40 also includes a microprocessor, memory, etc. and controls the operating switch circuit 45 in accordance with information exchanged with the main power distribution unit 2 and the sub power distribution unit 3 via the multiplex signal transmission unit 41. The control operation of the control unit 40 will be described later.

The control unit 40 and the multiplex signal transmission unit 41 correspond to the electrical circuits of the present invention, while the tail lamps 121 correspond to a load of the present invention.

Note that the power feed lines are divided into two systems 23 in the main power distribution unit 2, that is, the power feed line from the battery 1 becomes the power feed line 6 for driving the loads via the relay switch circuit 24 and the power feed line 7 for driving the electronic control circuits via the IPS.

In the present embodiment, the loads are the hazard lamp 101 and the head lights 102 driven under the control of the main power distribution unit 2, the room lamp 111, the door lock motor 112, and the coil 113 driven under the control of the sub power distribution unit 3, and the tail lamp 121 driven under the control of the sub power distribution unit 4.

These loads are supplied with power from the load use power feed line 6 via the operating switch circuits 25 and 26, the operating switch circuits 35 to 37, and the operating switch circuit 45, respectively.

In this embodiment, the control unit 20, the multiplex signal transmission unit 21, and the signal input unit 22 of the main power distribution unit 2, the control unit 30, the multiplex signal transmission unit 31, and the signal input unit 32 of the sub power distribution unit 3, and the control unit 40 and the multiplex signal transmission unit 41 of the sub power distribution unit 4 correspond to the electrical circuits of the present invention. These circuits receive power from the power feed line 7 for driving electronic control circuits via the IPS 23.

Note that the control unit 20, the multiplex signal transmission unit 21, and the signal input unit 22 in the main power distribution unit 2 which should operate while the vehicle is not in operation or is stopped receive power directly from the battery 1 without going through the IPS 23.

The power feed system for driving the loads will be described next. The power feed system for driving the loads is configured by two stages comprised of the relay switch circuit 24 which makes the load use power feed line 6 live or dead and the operating switch circuits 25 and 26, the operating switch circuits 35 to 37, and the operating switch circuit 45 for controlling the supply of power to each load.

Namely, in this embodiment, when the control unit 20 sets the relay switch circuit 24 to the connection state (ON), power can be supplied to the loads via the operating switch circuits 25 and 26, the operating switch circuits 35 to 37, and the operating switch circuit 45. On the other hand, when the control unit 20 sets the relay switch circuit 24 to the nonconnection state (OFF), the supply of power to all loads is shut off.

In this embodiment, as the first switch means for disconnecting and connecting the battery 1 and the load use power feed line 6, to enable the supply of power to the loads to be completely shut off or enabled, use is made of a relay switch circuit 24 having a connecting point "C" with a large current carrying capacity since a considerable current flows through the loads as a whole.

On the other hand, as the second switch means (third switch means) for each load, for example, the hazard lamp 101, use is made of an operating switch circuit or other switching element having a small load capacity, for example, a power transistor or a power MOSFET, because the individual load capacities are not that large. Of course, a relay switch circuit similar to the relay switch circuit 24 can also be used for the operating switch circuits 25 and 26 etc.

Next, an explanation will be given of the supply of power to the electrical circuits.

The control unit 20, the multiplex signal transmission unit 21, and the signal input unit 22 are designed to be supplied with power from the battery 1 at all times. Of course, the microprocessor, memory, etc. of the control unit 20 are designed to enter the sleep mode when not operating so as to minimize the power consumption.

The supply of power to the control unit 30, the multiplex signal transmission unit 31, and the signal input unit 32 in the sub power distribution unit 3 and the control unit 40 and the multiplex signal transmission unit 41 in the sub power distribution unit 4 is limited to when the control unit 20 sets the IPS 23 to the connection state (ON) to make the power feed line 7 for driving the electronic control circuits live.

That is, the electrical circuits of the sub power distribution unit 3 and the sub power distribution unit 4 are not supplied with power when the 23 is in the nonconnection state, so these electrical circuits do not consume any power at all.

Further, when the IPS 23 is in the nonconnection state, since no power is consumed by the electrical circuits of the sub power distribution unit 3 and the sub power distribution unit 4, it is not necessary to use a microprocessor having a sleep mode as the microprocessor of the control units 30 and 40 etc.

Figure 2:
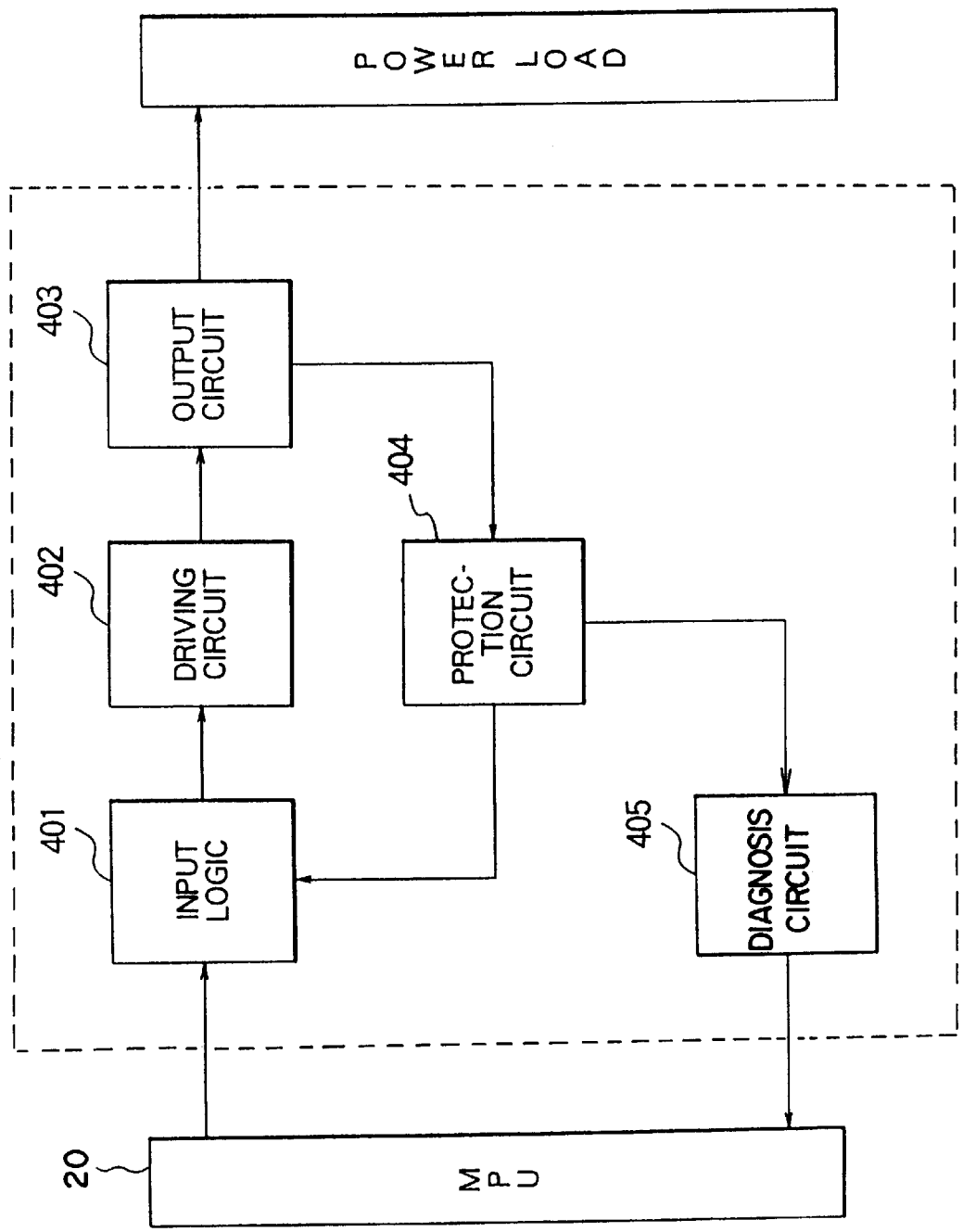
FIG. 2 is a view of the configuration of the circuit of an intelligent power switch (IPS) shown in FIG. 1.

The circuit configuration of the IPS 23 will be explained next with reference to FIG. 2.

The IPS 23 comprises an input logic 401 receiving control signals from the control unit 10, a drive circuit 402, and an output circuit 403 since it determines whether power is being supplied to the loads, in this embodiment, the control units 30 and 40 etc. connected to the power feed line 7 for driving the electronic control circuits. It determines whether power is being supplied to the power feed line 7 for driving the electronic control circuits by the output of the output circuit 403.

Further, the IPS 23 is provided with a protection circuit 404 and a diagnosis circuit 405. The protection circuit 404 protects the electrical circuits etc. in the IPS 23 from overcurrent and overvoltage. The diagnosis circuit 405 diagnoses the state of the internal circuits of the IPS 23 in accordance with a request for diagnosis from the control unit 20.

As an actual product of the IPS 23, see for example the TPD1004S produced by Toshiba.

The multiplex signal transmission unit 21, the multiplex signal transmission unit 31, and the multiplex signal transmission unit 41 can transmit information among each other via the multiplex signal transmission line 8.

Next, an explanation will be made of the operation of the vehicular use power distribution apparatus shown in FIG. 1.

First State (Normal State)

The state in which a vehicle is operating normally is referred to as the "first state".

In the first state, the relay switch circuit 24 is set to the "ON" state by the control unit 20. In this state, it is possible to supply power to all loads, for example, for the hazard lamp 101, via the load use power feed line 6.

Of course, the IPS 23 is also set to the "ON" state by the control unit 20. In this state, the control unit 30, the multiplex signal transmission unit 31, the signal input unit 32, the control unit 40, and the multiplex signal transmission unit 41 are supplied with power via the power feed line 7 for driving the electronic control circuits and are able to operate.

Second State

When the ignition key switch 131, the headlight operation switch 132, the hazard indication switch 133, the operation switch 134, and other components connected to the sub power distribution unit 3 are in the nonconnection state, that is, the "OFF" state, the control unit 30 reads these states via the signal input unit 32, and outputs these read states via the multiplex signal transmission unit 31 and the multiplex signal transmission line 8 to the multiplex signal transmission unit 21 of the main power distribution unit 2 to inform the control unit 20.

Of course, the ignition key switch 131 is connected directly to the signal input unit 22 of the main power distribution unit 2 via the signal input line 9, so the control portion 20 detects the "OFF" condition of the ignition key switch 131 directly.

If the ignition key switch 131 continues to be in the "OFF" state after a predetermined time (first predetermined time) has passed from when the control unit 20 detects the "OFF" state of the ignition key switch 131, the control unit 20 judges that the vehicle is in the non-operation state, sets the relay switch circuit 24 to the nonconnection state ("OFF"), and shuts off the supply of power in the power feed line 6 for driving the loads. Therefore, even if the headlights 102 were turned on while the headlight operation switch 132 was left ON as the second mode switching signal, the extinguished state is entered automatically.

The same is true for the other loads. No power is consumed by the loads.

In this second state, the IPS 23 is in the "ON" state and the power is supplied to the control unit 30 of the sub power distribution unit 3 etc. via the power feed line 7 for driving the electronic control circuits.

The state in which unnecessary consumption of power is stopped is referred to here as the "second state".

Return from Second State to First State

When for example the door is opened, the door lock switch (operating switch 134) is operated, or some other operation is performed within a predetermined time (second predetermined time) in the second state, the control unit 30 of the sub power distribution unit 3 detects this and informs it to the control unit 20 via the system of the multiplex signal transmission unit 31, multiplex signal transmission line 8, and multiplex signal transmission unit 21.

When the control unit 20 receives information indicating the occurrence of some sort of the above operation from the control unit 30, the control unit 20 sets the relay switch circuit 24 to the connection state ("ON") and enables the supply of power for the load use power feed line 6 to the loads. Accordingly, the first state is returned to.

Further, as the second mode switching signal, after for example the signal for turning on the headlights is switched to "OFF" and then switched to "ON", the control unit 30 detects the change of the switch and returns the system to the first state.

Transition from Second State to Third State

When there is no such operation as described above even after a predetermined time has passed in the second state, the control unit 20 sets the IPS 23 to the "OFF" state so as to cut off the power feed line 7 for driving the electronic control circuits from the battery 1.

According to this, the supply of power to the control unit 30 of the sub power distribution unit 3, the control unit 40 of the sub power distribution unit 4, etc. is cut off.

This state is referred to as the "third state".

In the second state, the load use power feed line 6 is in the inactive state and no power is consumed by the loads. In the third state, the supply of power to the electrical circuits of the sub power distribution unit 3 and the sub power distribution unit 4, though not the electrical circuits of the main power distribution unit 2, is cut off. Therefore, no power is consumed by the electrical circuits of the sub power distribution units, though not the main power distribution unit 2, at all. Accordingly, even if a vehicle is not operated for a long period such as for example when exported overseas, no power is consumed except by the control unit 20 of the main power distribution unit 2.

In addition, since the control unit 20 etc. enter the sleep mode, its power consumption is very small.

Return from Third State to First State

When the driver turns the ignition key switch 131 "ON", the control unit 20 detects the "ON" state of the ignition key switch 131 input via the signal input line 9 and sets the IPS 23 to the "ON" state so as to resume the supply of power to the sub power distribution unit 3 and the sub power distribution unit 4 from the battery 1 via the power feed line 7 for driving the electronic control circuits. Due to this, the control unit 30, the control unit 40, etc. are able to be operated.

Further, the control unit 20 sets the relay switch circuit 24 to the "ON" state so as to make the load use power feed line 6 live. Due to this, the supply of power from the battery 1 to the loads becomes possible. That is, the first state is returned to.

As described above, according to this embodiment, the first to third states (modes) are defined just by using the operation of existing operating switches, in particular, the operation of the ignition key switch 131, and the components which can operate and which should be made nonoperable in these states are differentiated. As a result, it is possible to optimize the consumption of the power of the battery 1 in accordance with the particular condition.

The present invention is not limited to the embodiment described above. Various changes and modifications are possible.

Further, the condition of the changes of the state and the content of the processing in each state are not limited to those of the embodiment described above and can be modified suitably in accordance with the condition of the vehicle etc.

For example, the change from the first state to the second state may take place after a first predetermined time has passed from when the ignition key switch 131 is turned to the "OFF" position while the door is closed.

The change to the third state may take place when a second predetermined time has passed in the second state.

These modifications of the change in state may be easily achieved in the control unit 20 using the microprocessor.

The load controlled by the main power distribution unit 2, the load controlled by the sub power distribution unit 3, the load controlled by the sub power distribution unit 4, and the switches input to the sub power distribution unit 3 are examples and may be freely changed in accordance with the vehicle.

According to this embodiment, since the power feed system is divided into a power feed system for driving the loads and a power feed system for driving the electronic control circuits and the cutoff of the supply of power to the leads and the cutoff of the supply of power to the control circuits are controlled, it is possible to optimize the consumption of power in accordance with the condition of the vehicle and to thereby prolong the battery life.

In particular, according to the present invention, it is possible to automatically prevent power continuing to be supplied to a load due for example to a forgotten operation.

Further, according to this embodiment, it is possible to minimize the power consumption in the main control means even when the vehicle in not being operated for a long time.

Second Embodiment

Figure 3:
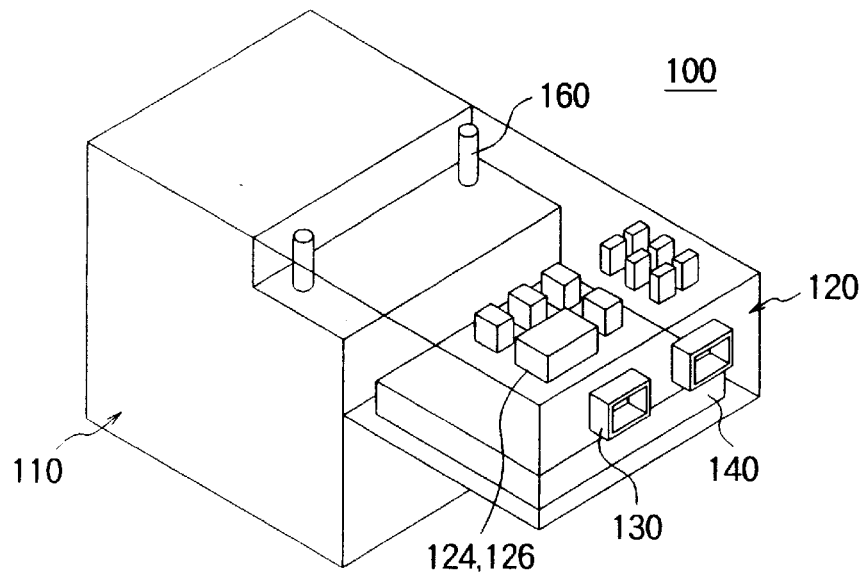
FIG. 3 is a perspective view of a vehicular use power source apparatus according to a second embodiment of the present invention.

FIG. 3 is a perspective view of a vehicular use power source apparatus according to a second embodiment of the present invention.

Figure 4:
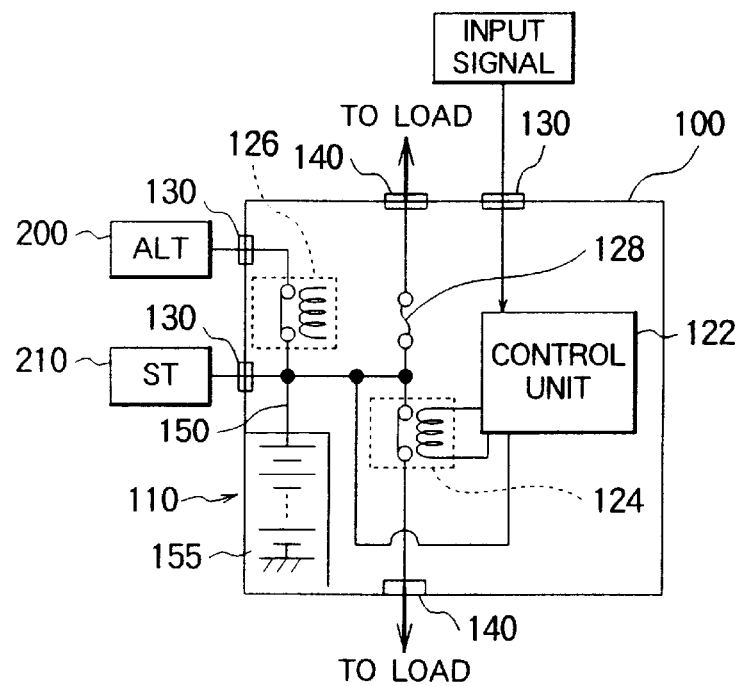
FIG. 4 is a circuit diagram of a first example of the configuration of an internal circuit of the vehicular use power source apparatus shown in FIG. 3.

FIG. 4 is a circuit diagram of a first example of the configuration of the internal circuit of the vehicular use power source apparatus illustrated in FIG. 3.

The vehicular use power source apparatus 100 comprises a storage battery unit 110 and an electrical circuit unit 120. The storage battery unit 110 and the electrical circuit unit 120 together constitute the vehicular use power source apparatus 100.

As shown in FIG. 4, the storage battery unit 110 houses the battery 155 inside and is surrounded by a housing.

The electrical circuit unit 120 corresponds to a relay box and comprises a control unit 122, a relay switch 124 connected to the load use power feed line, a charging relay switch circuit 126, etc. The control unit 122 is supplied with power from a battery 155 within the vehicular use power source apparatus 100.

Since the battery 155 is charged by the alternator 200, the battery 155 is capable of being connected to the alternator 200, but the charging use relay switch circuit 126 or a fuse is placed between the two so as to enable the connection to be cut when it is necessary to cut the connection to the alternator 200 for some reason or another.

Further, the supply of power from the battery 155 to the loads is designed to be able to be cut by the relay switch 124 or the fuse 128.

A wiring unit 150 between the battery 155 and the relay switch 124 and between the battery 155 and the charge use relay switch 126 within the vehicular use power source apparatus 100 uses copels and other electrical connection parts capable of absorbing vibration.

Accordingly, parts will not detach from the vehicular use power source apparatus 100 due to vibration etc.

Further, connection members connecting the battery 155 and the relay switch 124 or charge use relay switch 126 are not exposed to the outside, unlike the past, there is no short-circuiting of the large current carrying cable with the chassis, entanglement with or sandwiching between parts mounted in the vehicle, etc. Further there is no thick cable carrying a large current, so that it is not necessary to lay such a thick cable within the engine compartment.

The vehicular use power source apparatus 100 illustrated in FIG. 3 and FIG. 4 is connected with the outside via the signal connector 130 and the power source connector 140.

In the example illustrated in FIG. 4, an input signal is supplied to the control unit 122. The control unit 122 controls the relay switch 124 and the charge use relay switch 126 to supply power in accordance with the input signal.

As the signal input to the control unit 122, for example, there is for example the output signal from the headlight drive switch, the wiper operation switch, and the alternator 200 and the multiplex input signal from other units performing multiplex communication.

For example, when the output signal from the alternator 200 is supplied, the control unit 122 sets the charge use relay switch 126 to the connection state ("ON") to cause power to be supplied to the control unit 122 from the alternator 200.

Further, when a drive request signal from a load is supplied to the control unit 122, the control unit 122 sets the relay switch 124 to the connection state to enable the supply of power to the load.

Figure 5:
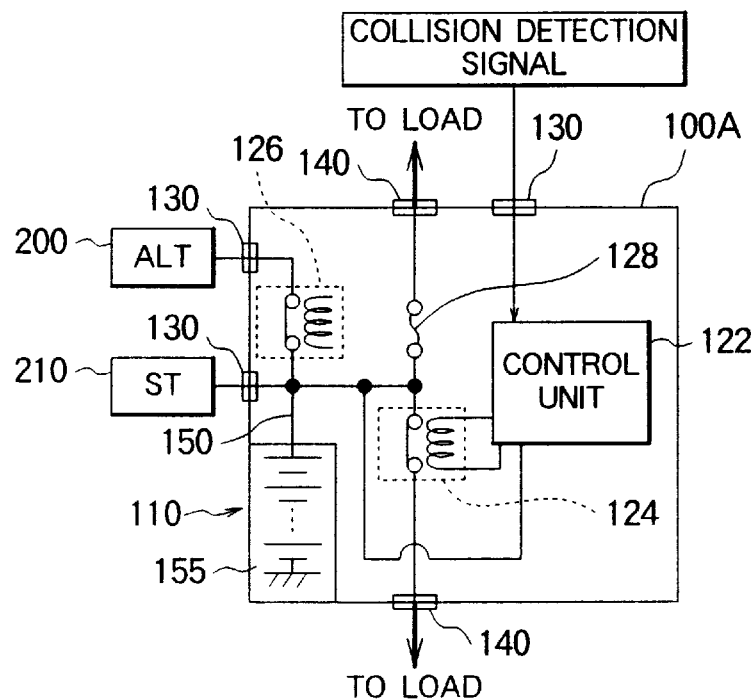
FIG. 5 illustrates a circuit in which the control unit is driven to perform emergency measures by a collision detection signal instead of the input signal shown in FIG. 4.

FIG. 5 illustrates a circuit in which the control unit 122 is driven for emergency measures by a collision detection signal instead of the input signal shown in FIG. 4.

For example, when the vehicle is involved in a collision, an air bag deployment signal or the signal of a collision detection sensor is supplied to the control unit 122 as a collision detection signal. At this time, the control unit 122 sets the relay switch 124 to the nonconnection state ("OFF") to stop the supply of power to the loads on an emergency basis. As a result, it is possible to prevent accidents accompanying the supply of power from the battery 155 after a collision.

In particular since the vehicular use power source apparatus 100 of the present embodiment does not have any cables carrying large currents exposed to the outside, it is possible to prevent accidents involving electricity.

Figure 6:
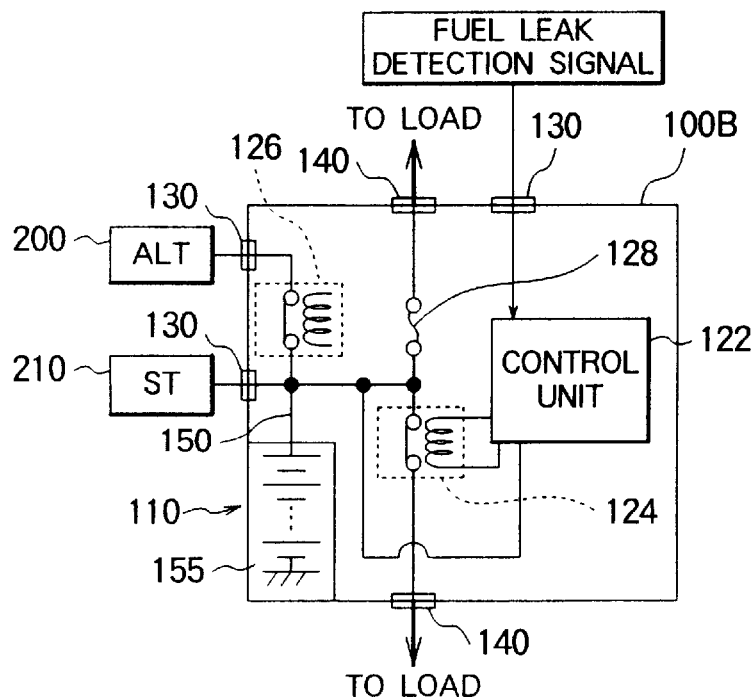
FIG. 6 illustrates a circuit in which the control unit is driven to perform emergency measures by a fuel leak detection signal instead of the input signal shown in FIG. 4 and the collision detection signal shown in FIG. 5.

FIG. 6 illustrates a circuit in which the control unit is driven to perform emergency measures by a fuel leak detection signal instead of the input signal shown in FIG. 4 and the collision detection signal shown in FIG. 5.

For example, when the vehicle is involved in a collision and a fuel leaks occurs, a fuel leak detection sensor detects this and drives the control unit 122. At this time, the control unit 122 sets the relay switch 124 to the nonconnection state ("OFF") and stops the supply of power to the load on an emergency basis. As a result, it is possible to prevent the occurrence of accidents related to the fuel leak and electricity from the battery 155.

In particular, according to the vehicular use power source apparatus 100 of the present embodiment, no large current carrying cable is exposed to the outside, so it is possible to prevent accidents related to electricity.

Third Embodiment

Figure 7A:
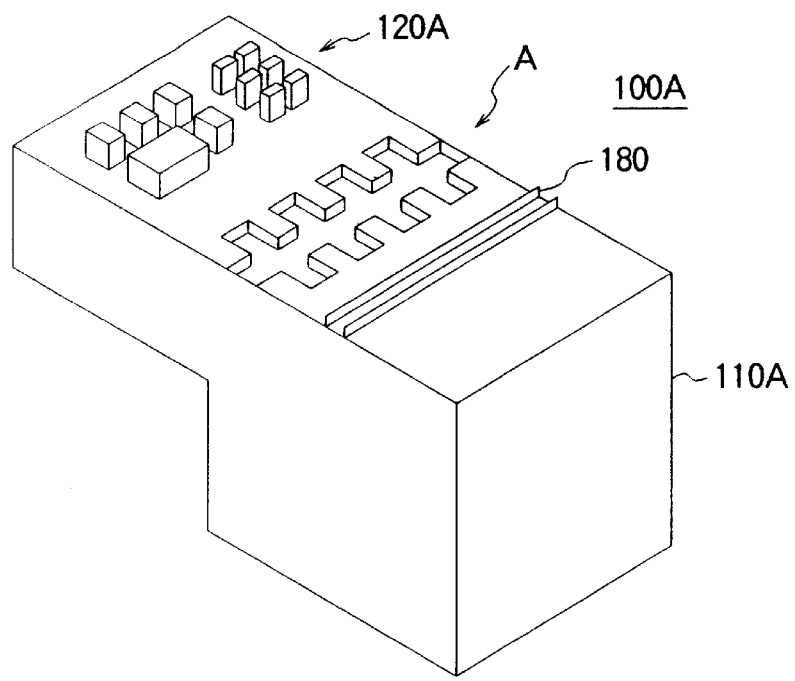
FIGS. 7A and 7B are perspective views of a vehicular use power source apparatus according to a third embodiment of the present invention.
Figure 7B:
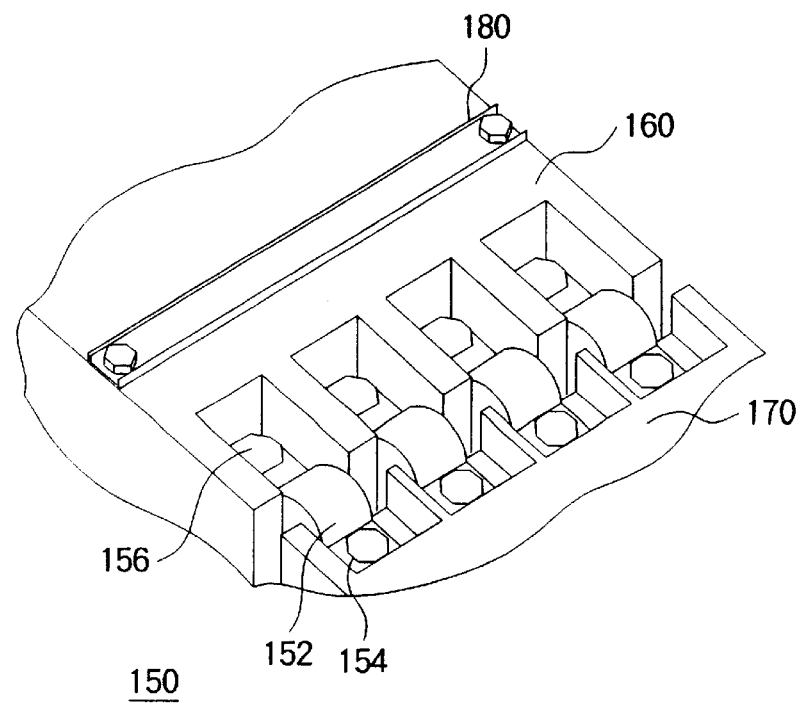

FIGS. 7A and 7B are perspective views of a vehicular use power source apparatus 100A according to a third embodiment of the present invention.

The vehicular use power source apparatus 110A houses the battery 155 inside.

Compared with the vehicular use power source apparatus 100 illustrated in FIG. 3, the housing is shaped as a rhomboid and is affixed by the fixing member 180.

The portion shown as a wiring portion 150 in FIG. 4 to FIG. 6 has a busbar terminal illustrated enlarged in FIG. 7B. This busbar terminal is connected by a copel 152 or other electrical connection member, is affixed at the upper cover 160 of the housing of the storage battery by busbar bolts 156, and is affixed to the electric circuit insulating member 170 by the busbar bolts 154.

Note that the copels 152 of the upper part of the vehicular use power source apparatus 100A are very short.

In the vehicular use power source apparatus 100A as well, it is also possible to control the drive of the relay switch 124 and the charge use relay switch 126 illustrated in FIG. 4 to FIG. 6.

Fourth Embodiment

Figure 8:
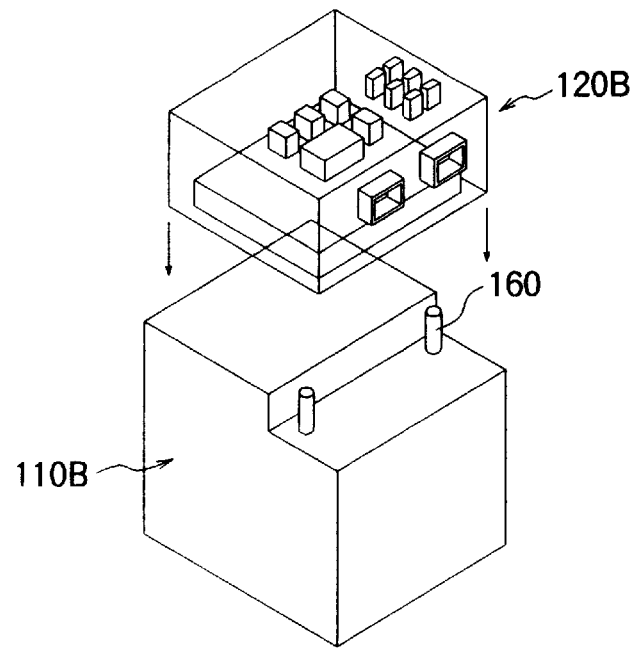
FIG. 8 is a perspective views of a vehicular use power source apparatus according to a fourth embodiment of the present invention.

FIG. 8 is a perspective view of a vehicular use power source apparatus 100B according to a fourth embodiment of the present invention.

The storage battery unit 110B houses the battery 155 inside.

The electrical circuit unit 120B is placed directly above the storage battery unit 110B as an upper cover of the storage battery unit 110B. That is, the upper cover is shaped to house the electrical circuit unit 120B. No member is used to fasten the storage battery unit 110B and electrical circuit unit 120B. Therefore, there is no longer any power feed line exposed outside of the housing of the battery. As a result, there is no trouble with vibration while the vehicle is running or entanglement with or sandwiching in by the mounted parts.

Further, since the electrical circuit unit 120B is fit on top of the storage battery unit 110B as a cover, there is no connection to reverse polarities due to the positional relationship of the terminals.

The vehicular use power source apparatus 100A as well can control the drive of the relay switch 124 and the charge use relay switch 126 illustrated in FIG. 4 to FIG. 6.

Fifth Embodiment

Figure 9:
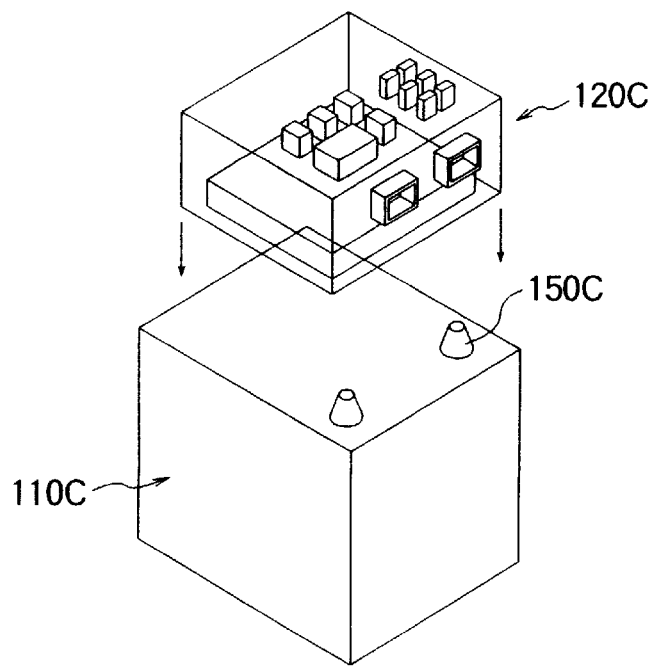
FIG. 9 is a perspective view of a vehicular use power source apparatus according to a fifth embodiment of the present invention.

FIG. 9 is a perspective view of a vehicular use power source apparatus 100c according to a fifth embodiment of the present invention.

The vehicular use power source apparatus 100c is similar to the vehicular use power source apparatus 100B illustrated in FIG. 8, however, the taper terminals 150c are located at the top of the storage battery unit 110c.

This taper terminals 150c facilitate engagement with the bottom of the upper cover, that is, the electrical circuit unit 120c, reduces the contact resistance by broadening the area, and further prevents connection to reverse polarities.

This vehicular use power source apparatus 100C can also control the drive of the relay switch circuit 124 and the charge use relay switch circuit 126 illustrated in FIG. 4 to FIG. 6.

FIG. 3 and FIG. 7 to FIG. 9 illustrated vehicular use power source apparatuses as examples of the present invention. Each of these vehicular use power source apparatuses was made smaller in overall size by making the storage battery unit 110 and the electrical circuit unit 120 integral instead of placing them separately within the engine compartment. This is extremely advantageous in the design of the engine compartment and the arrangement of different members.

Further, since cables are not laid within the engine compartment, the inside of the engine compartment becomes simpler and entanglement of the cable with or sandwiching by other members will not occur.

The connections to loads etc. may be realized by using the power source connector 140, while the connections to signal lines may be realized by using the signal connector 130.

That is, according to the vehicular use power source apparatus of the present embodiment, since the battery and the relay box are made integral, the overall size (dimensions) become smaller.

Since the vehicular use power source apparatus according to the present embodiment is designed to be able to cut off the supply of power from the battery by the relay switch circuit in the electrical circuit unit formed integrally with the battery, no current will flow from the vehicular use power source apparatus when an accident etc. occurs.

In addition, since the power from the battery is cut off all at once, the cutoff is absolute.

Further, since the vehicular use power source apparatus does not have any exposed cables carrying large currents, even in the event of a breakdown, accident, etc., there will never be any contact with such a live cable and consequent serious accident.

Sixth Embodiment

Figure 10:
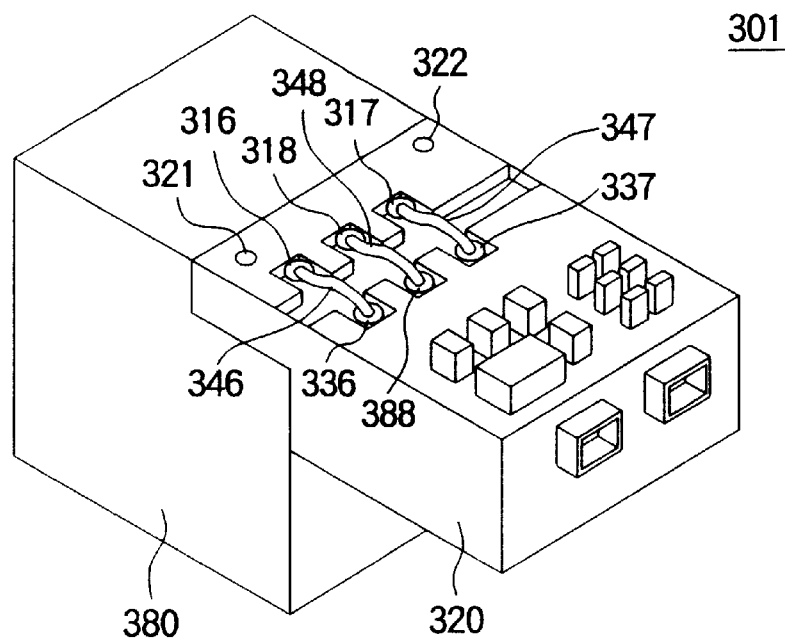
FIG. 10 is an external view of a vehicular use power source apparatus 301 according to a sixth embodiment of the present invention.
Figure 11:
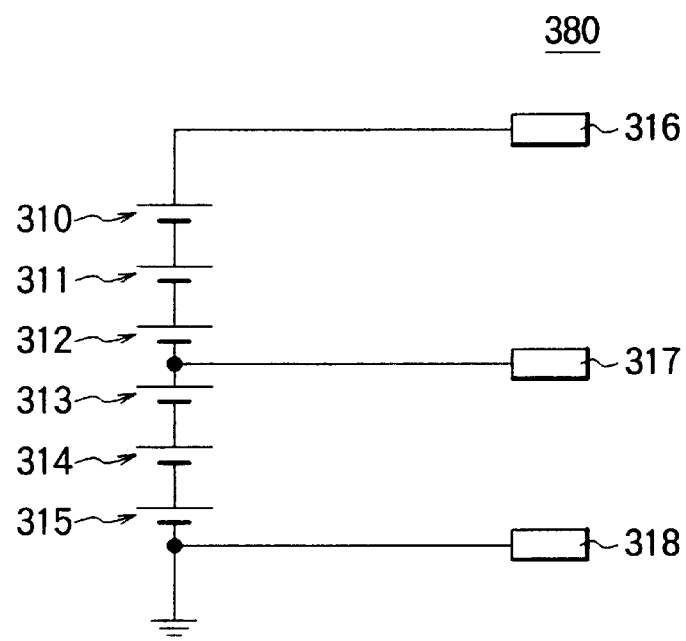
FIG. 11 is a view of the circuit configuration of a vehicular use power source apparatus according to the sixth embodiment of the present invention.

FIG. 10 is an external view of the vehicular use power source apparatus 301 according to a sixth embodiment of the present invention, while FIG. 11 is a view of the configuration of the vehicular use power source apparatus 301.

As shown in FIG. 10, the vehicular use power source apparatus 301 comprises a storage battery unit 380 and an electrical circuit unit 320. The storage battery unit 380 and the electrical circuit unit 320 are formed as one unit and constitute the vehicular use power source apparatus 301.

As shown in FIG. 11, the storage battery unit 380 includes a lead acid battery constituted by cells 310, 311, 312, 314, and 315 connected in series. A plus terminal 316 is led out from a plus electrode of the cell 310. Further, a plus terminal 317 is led out from the connecting point between the minus electrode of the cell 312 and the plus electrode of the cell 313. Further, a minus terminal 318 is led out from the minus electrode of the cell 315. The minus electrode of the cell 315 is connected to the earth.

In the case of a lead acid battery, each of the cells 310 to 315 has an electromotive force of approximately 2.1V so the potential of the plus terminal 317 becomes approximately 6.3 (=2.1×3) V. Further, the potential of the plus terminal 316 becomes approximately 12.6 (=2.1×6) V.

That is, according to the storage battery unit 380, the voltage for driving loads of the vehicle such as for starting the engine is supplied from the plus terminal 316, while the voltage for driving electronic control circuits is supplied from the plus terminal 317.

Further, as shown in FIG. 10, the electronic circuit unit 320 containing the electronic control circuits is affixed to the storage battery unit 380 via bolts 320 and 321.

The plus terminal 316, the minus terminal 318, and the plus terminal 317 are exposed at the surface of the storage battery unit 380.

Further, the plus terminal 336, the minus terminal 338, and the plus terminal 337 are exposed at the surface of the electronic circuit unit 320.

Further, the plus terminal 316 and the plus terminal 336 are connected with each other via a conductive plate 346, the minus terminal 318 and the minis terminal 338 are connected with each other via a conductive plate 348, and the plus terminal 317 and the plus terminal 337 are connected with each other via a conductive plate 347.

That is, the voltage for driving electronic control circuits is supplied from the plus terminal 316 to the plus terminal 336 of the electronic circuit unit 320 via the conductive plate 346.

The electronic control circuits of the electronic circuit unit 320 is driven by the voltage for driving electronic control circuits.

As explained above, according to the vehicular use power source apparatus 301, it is possible to shorten the length of the power feed line for driving loads and thereby improve safety since the electronic circuit unit 320 is arranged close by.

Seventh Embodiment

Figure 12:
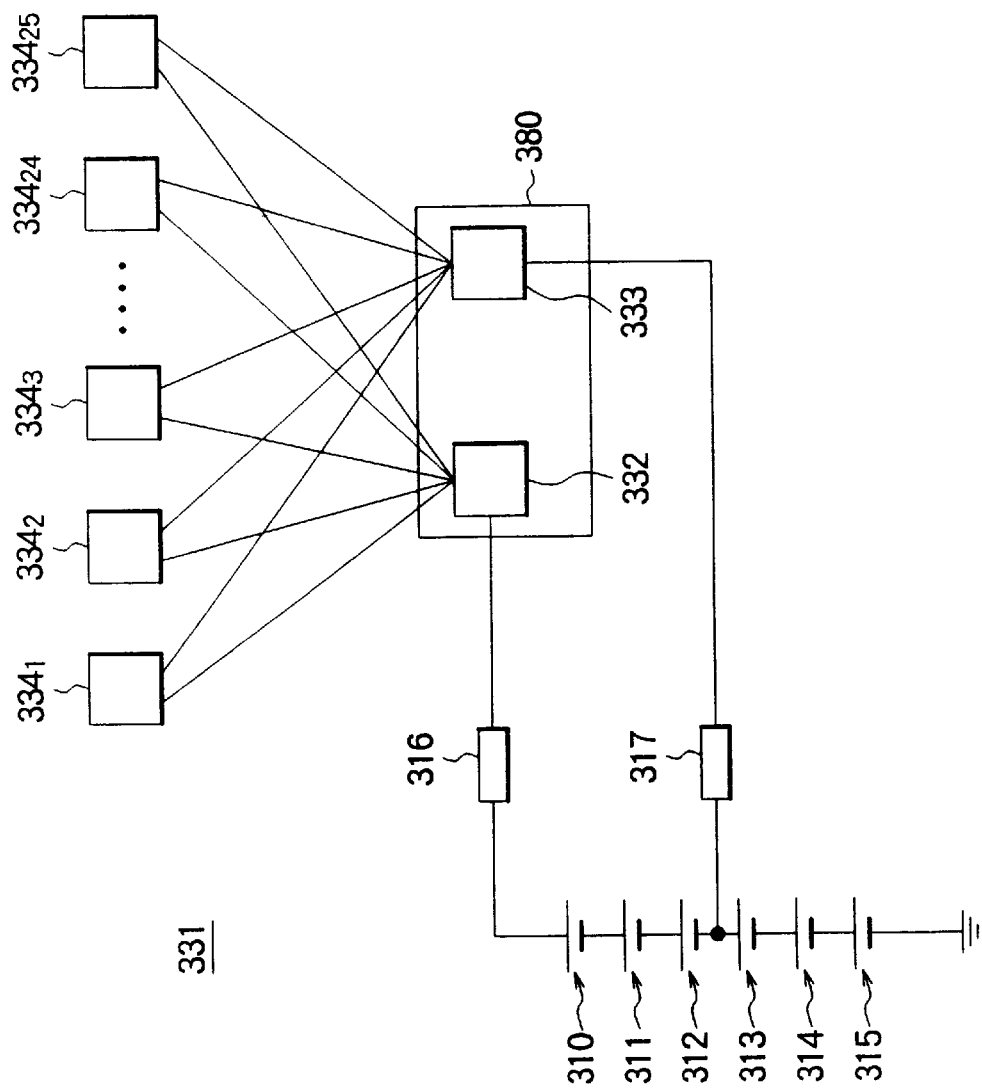
FIG. 12 is a view of the configuration of a vehicular use power source apparatus according to a seventh embodiment of the present invention.

FIG. 12 is a view of the configuration of the vehicular use power source apparatus 331 according to a seventh embodiment of the present invention.

As shown in FIG. 12, the vehicular use power source apparatus 331, similar to the vehicular use power source apparatus 301 shown in FIG. 11, has a lead acid storage battery comprised of the cells 310, 311, 312, 313, 314, and 315 connected in series and, in addition, a relay box 380. Further, the plus terminal 316 is led out from the plus electrode of the cell 310. Further, the plus terminal 317 is led out from the connecting point between the minus electrode of the cell 312 and the plus electrode of the cell 313. Further, the minus electrode of the cell 315 is connected with the earth.

In the case of a lead acid battery, each of the cells 310 to 315 has an electromotive force of approximately 2.1V. The potential of the plus terminal 317 becomes approximately 6.3V and the potential of the plus terminal 316 becomes approximately 12.6V.

That is, according to the vehicular use power source apparatus 331, the voltage for driving loads of the vehicle such as for starting the engine is supplied from the plus terminal 316, while the voltage for driving electronic control circuits is supplied from the plus terminal 317.

The connection circuit 332 supplies the voltage for driving loads from the plus terminal 316 to 25 mounted loads.

The connection circuit 333 supplies the voltage for driving electronic control circuits from the plus terminal 317 to 25 mounted loads $334_1$ to $334_{25}$.

The loads $334_1$ to $334_{25}$ are driven by the voltage for driving loads supplied from the connection circuit 332.

For example, as the loads, there are the headlights and other lamp loads, the wiper motor and other motor loads, and the rear differential gear and other resistance loads.

Further, the loads $334_1$ to $334_{25}$ are provided with electronic control circuits for controlling the driving of the corresponding loads. The corresponding electronic control circuits are driven by the voltage for driving electronic control circuits supplied from the connection circuit 333. Here, as electronic control circuits, there are the engine computer, air bag computer, ABS computer, and suspension controller.

According to the vehicular use power source apparatus 331, the voltage for driving loads and the voltage for driving electronic control circuit are supplied by a single apparatus which has a simple and inexpensive configuration not requiring the provision of DC transformers in any of the loads $334_1$ to $334_{25}$.

Eighth Embodiment

Figure 13:
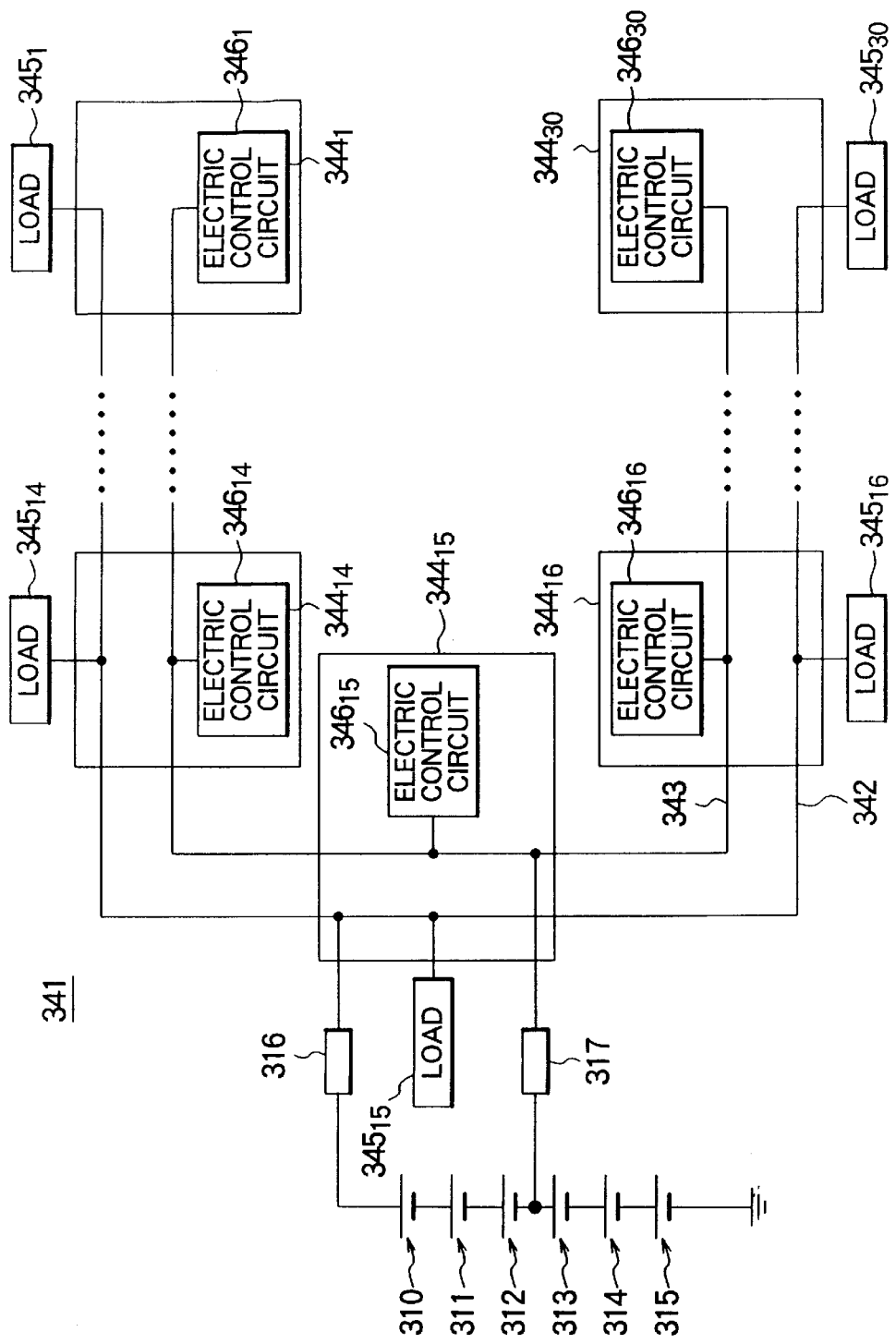
FIG. 13 is a view of the configuration of a vehicular use power distribution apparatus according to an eighth embodiment of the present invention.

FIG. 13 is a view of the configuration of a vehicular use power distribution apparatus 341 according to an eighth embodiment of the present invention.

As shown in FIG. 13, the vehicular use power distribution apparatus 341, like the vehicular use power source apparatus 301 illustrated in FIG. 11, has for example a lead acid battery comprised of cells 310, 311, 312, 313, 314, and 315 connected in series and, further, a power feed line 342 for driving loads and a power feed line 343 for driving electronic control circuits.

The plus terminal 316 led out from the plus electrode of the cell 310 is connected to the power feed line 342 for driving loads.

Further, the plus terminal 317 led out from the connecting point between the minus electrode of the cell 312 and the plus electrode of the cell 313 is connected to the power feed line 343 for driving electronic control circuits. Further, the minus electrode of the cell 315 is connected to the earth.

In the case of a lead acid battery, each of the cells 310 to 315 has an electromotive force of approximately 2.1V. The potential of the plus terminal 317 becomes approximately 6.3V, while the potential of the plus terminal 316 becomes approximately 12.6V.

That is, according to the vehicular use power distribution apparatus 341, the voltage for driving loads of the vehicle such as for starting the engine is supplied from the plus terminal 316 to the power feed line 342 for driving loads, while the voltage for driving the electronic control circuits is supplied from the plus terminal 317 to the power feed line 343 for driving the electronic control circuits The power feed line 342 for driving the loads and the power feed line 343 for driving the electronic control circuit drives are led for example to the power distribution units $344_1$ to $344_{30}$.

The power distribution units $344_1$ to $344_{30}$ supply voltage for driving the loads from the power feed line 342 for driving loads to the loads $345_1$ to $345_{30}$.

The loads $345_1$ to $345_{30}$ are driven by the voltage for driving loads.

Here, as the loads, there are for example the headlights, turn lamps, and other lamp loads, wiper motor, blower, and other motor loads, and rear differential gear and other resistance loads.

Note that two or more loads can be connected to the vehicular use power distribution apparatus 341.

The power distribution units $344_1$ to $344_{30}$ are provided with the electronic control circuits $346_1$ to $346_{30}$ respectively. The voltage for driving electronic control circuits is supplied from the power feed line 343 to the electronic control circuits $346_1$ to $346_{30}$.

The electronic control circuits $346_1$ to $346_{30}$ are driven by the voltage for driving electronic control circuit drives and control the operation of the loads $345_1$ to $345_{30}$.

This embodiment is particularly effective in a multiplex communication system.

According to the vehicular use power distribution apparatus 341, it is not necessary to provide the power distribution units $344_1$ to $344_{30}$ with DC voltage transformers so the configuration of the hardware is simple and inexpensive.

The present invention is not limited to the above embodiment.

For example, in the present invention, the connections between the loads and the electronic control circuits and battery are not limited to the examples illustrated in FIG. 11, FIG. 12, and FIG. 13 and can be modified in various ways.

Further, while the above embodiment showed an example in which only one battery of cells connected in series was, it is possible to provide a plurality of batteries of cells connected in series in parallel.

What is claimed is:

1. A vehicular use power distribution apparatus comprising:

a battery mounted in a vehicle;

main control means connected directly to said battery and receiving first and second mode switching signals from operation switches in the vehicle;

a first switch means connected to said battery;

a first power feed line, connected to said first switch means, for supplying power to loads mounted in the vehicle;

a second switch means connected to said battery;

a second power feed line connected to said second switch means; and sub control means connected to said second power feed line for controlling power supply to the loads, wherein said main control means, in a first state, sets said first switch means and said second switch means to a connection state so as to supply power from said battery to said first power feed line and said second power feed line;

when there is no change in said first and second mode switching signals within a first predetermined time after a change of said first mode switching signal, said main control mean sets said first switch means to a nonconnection state as a second state where the supply of power to said first power feed line is stopped; and after a second predetermined time has passed in said second state, said main control means sets said second switch means to a nonconnection state as a third state where the supply of power to said second power feed line is stopped.

2. A vehicular use power distribution apparatus as set forth in claim 1, further comprising a third switch means for determining whether to supply power to each load, wherein said main control means and said sub control means control said third switch means so as to drive the corresponding loads.

3. A vehicular use power distribution apparatus as set forth in claim 1, wherein said second mode switch signal includes an ignition key switching signal or a door lock signal.

4. A vehicular use power distribution apparatus as set forth in claim 1, wherein, in said second state, said main control means returns to said first state in accordance with a change in said first mode switching signal or a change in said second switching signal.

5. A vehicular use power distribution apparatus as set forth in claim 4, wherein said second mode switching signal includes a switching signal for lighting a room lamp of a vehicle, a switching signal for opening and closing doors, or a switching signal for lighting headlights.

6. A vehicular use power distribution apparatus as set forth in claim 1, wherein in said third state, said main control means returns to said first state in accordance with a change of a third mode switching signal received by said main control means from said operation switches.

7. A vehicular use power distribution apparatus as set forth in claim 6, wherein said third mode switching signal includes an ignition key switching signal.

8. A vehicular use power distribution apparatus as set forth in claim 1, wherein said first switch means includes a relay switch circuit and said second switch means includes a semiconductor switching element.

9. A vehicular use power distribution apparatus as set forth in claim 1, wherein said main control means has a microprocessor with a sleep mode in which the consumption of electricity becomes minimum.

10. A vehicular use power source apparatus comprising:

a first housing for housing a battery; and an electrical circuit unit having a second housing connectable to said first housing and enclosing switch means for enabling power supply from said battery and control means for controlling said switch means.

11. A vehicular use power source apparatus as set forth in claim 10, wherein said battery and said switch means are connected by a conductive member capable of compensating for vibration in said vehicular use power source apparatus.

12. A vehicular use power source apparatus as set forth in claim 10, wherein said second housing of said electrical circuit unit forms an upper cover of said first housing and further encloses said battery and said switch means, and said electrical circuit unit comprises terminals arranged so that said terminals are not capable of connecting with terminals of said battery in reverse polarities.

13. A vehicular use power source apparatus as set forth in claim 10, wherein said control means receives as input a signal, from a collision detecting device, indicating detection of a collision, and drives said switch means so as to stop the supply of power from said battery to the outside.

14. A vehicular use power source apparatus as set forth in claim 10, wherein said control means receives as input a signal, from a fuel leak detecting device, indicating a fuel leak, and drives said switch means so as to stop the supply of power from said battery to the outside.

15. A vehicular use power source apparatus as set forth in claim 10, wherein said control means receives as input a signal, from an operation switch, indicating permission for driving a load, and drives said switching means so as to enable the supply of power from said battery to an external load.

16. A vehicular use power source apparatus as set forth in claim 10, wherein said electrical circuit unit further comprises second switch means for connecting to an alternator and said control means is supplied with an alternator driving signal to drive said second switch means to enable charging of said battery.

17. A vehicular use power source apparatus comprising:

a battery comprising a plurality of cells connected in series;

a first power feed line led out from an electrode of a first cell located at an end of said battery and supplying a first voltage produced by storing all electromotive forces of the plurality of cells;

a second power feed line led out from an electrode of a second cell located at other than said end of said battery and supplying a second voltage produced by storing electromotive forces of the cells connected in series between a cell located at the end or non-end and said second cell;

a driving means of a load of a vehicle connected to said first power feed line and driving the loads of the vehicle with said first voltage; and a control means connected to said second power feed line for controlling driving of said load by said second voltage.

18. A vehicular use power source apparatus as set forth in claim 17, wherein said control means is located adjacent to said battery.

19. A vehicular use power source apparatus as set forth in claim 17, wherein said driving means is connected to said first power feed line via a first switch means; and said control means is connected to said second power feed line via a second switch means.

* * * * *